(12) United States Patent
Jog et al.

(10) Patent No.: US 7,493,351 B2
(45) Date of Patent: Feb. 17, 2009

(54) RAPID INTEGRATION MECHANISM FOR DIRECTORY BASED APPLICATIONS

(75) Inventors: Mandar U. Jog, Raleigh, NC (US); David Gerard Kuehr-McLaren, Apex, NC (US); John Ryan McGarvey, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 11/122,837

(22) Filed: May 5, 2005

(65) Prior Publication Data

US 2006/0253506 A1 Nov. 9, 2006

(51) Int. Cl.
*G06F 12/00* (2006.01)

(52) U.S. Cl. .......................... 707/204; 707/8; 707/203; 715/229

(58) Field of Classification Search ................. 707/201, 707/204, 203, 8; 715/229
See application file for complete search history.

(56) References Cited

U.S. PATENT DOCUMENTS

| | | | | |
|---|---|---|---|---|
| 5,592,664 | A * | 1/1997 | Starkey | 707/1 |
| 5,621,892 | A * | 4/1997 | Cook | 709/224 |
| 5,828,882 | A * | 10/1998 | Hinckley | 719/318 |
| 6,081,806 | A * | 6/2000 | Chang et al. | 707/8 |
| 6,128,640 | A * | 10/2000 | Kleinman | 718/102 |
| 6,185,613 | B1 * | 2/2001 | Lawson et al. | 709/224 |
| 6,247,135 | B1 * | 6/2001 | Feague | 713/400 |
| 6,275,831 | B1 * | 8/2001 | Bodnar et al. | 707/201 |
| 6,377,950 | B1 | 4/2002 | Peters et al. | 707/10 |
| 6,401,104 | B1 * | 6/2002 | LaRue et al. | 707/203 |
| 6,477,543 | B1 * | 11/2002 | Huang et al. | 707/200 |
| 6,484,177 | B1 | 11/2002 | Van Huben et al. | 707/10 |
| 6,633,924 | B1 * | 10/2003 | Wu et al. | 719/328 |
| 6,665,674 | B1 * | 12/2003 | Buchanan et al. | 707/10 |
| 6,751,797 | B1 | 6/2004 | Desgranges et al. | 719/315 |
| 6,883,036 | B1 * | 4/2005 | Barrett | 709/248 |
| 7,107,355 | B2 * | 9/2006 | Bethmangalkar et al. | 709/245 |
| 7,250,797 | B1 * | 7/2007 | Lawson | 327/144 |
| 2003/0055935 | A1 | 3/2003 | Tarrant et al. | 709/223 |
| 2003/0105887 | A1 | 6/2003 | Cox et al. | 709/328 |
| 2003/0115376 | A1 | 6/2003 | Drobychev et al. | 709/328 |
| 2003/0159074 | A1 * | 8/2003 | Oar et al. | 713/300 |
| 2004/0030775 | A1 * | 2/2004 | Lauzon et al. | 709/224 |
| 2004/0068523 | A1 * | 4/2004 | Keith et al. | 707/200 |
| 2004/0107212 | A1 | 6/2004 | Friedrich et al. | 707/104.1 |
| 2006/0184591 | A1 * | 8/2006 | Backholm et al. | 707/204 |

FOREIGN PATENT DOCUMENTS

WO WO 03/003140 * 1/2003

OTHER PUBLICATIONS

Esposito and Kumar, An Asynchronous integration and event detection algorithm for simulating multi-agent hybrid systems, ACM Transactions on Modeling and Computer Simulation, vol. 14, No. 4, Oct. 2004.*

* cited by examiner

*Primary Examiner*—Jean M Corrielus
*Assistant Examiner*—Augustine Obisesan
(74) *Attorney, Agent, or Firm*—Duke W. Yee; Robert Straight; James O. Skarsten

(57) ABSTRACT

A mechanism is provided for rapid integration of directory based applications. A directory proxy lies between applications and the back end repositories. A filtering mechanism detects application specific operations using a set of rules. Notification of a detected operation is sent to interested application-specific synchronization elements. A notified synchronization element requests the parent application to perform a semantically equivalent operation.

20 Claims, 6 Drawing Sheets

RAPID INTEGRATION MECHANISM FOR DIRECTORY BASED APPLICATIONS

BACKGROUND OF THE INVENTION

1. Technical Field

The present invention relates to directory based applications and, in particular, to the Lightweight Directory Access Protocol. Still more particularly, the present invention provides a method, apparatus, and program for rapid integration for directory based applications.

2. Description of Related Art

Considerable time and effort is spent integrating products that are written independently. This may translate into delay in integrated product deployment, and, consequently, customer dissatisfaction and loss of opportunity may result.

A large number of applications use Lightweight Directory Access Protocol (LDAP) directories to store data, typically identity data. For example, one application may store its users as an LDAP inetOrgPerson, while another application may store its users as a custom LDAP object.

LDAP is a protocol used to access a directory listing. LDAP support is implemented in Web browsers and e-mail programs and can query a LDAP-compliant directory. More particularly, LDAP is a simplified version of the Directory Access Protocol (DAP), which is used to gain access to X.500 directories.

Since two or more applications may store semantically equivalent data in separate directories, they may be candidates for integration. Sharing repository objects is a fundamental approach for integration. Sharing of repository objects guarantees that the logical view will be identical at all times. A common data model unifies the applications and solves problems that integration poses. This is a long-term solution that requires substantial investment and development effort.

Alternatively, it is possible to use a virtual directory to map LDAP objects from one object class to another so that an object stored in the repository of a first object class can be read through a virtual directory as a second object class. Thus, it is possible to store identity information in a first application format and use an auxiliary data store to perform vertical joins with the application data to produce objects in a second application format dynamically. However, LDAP servers have read-mostly usage characteristics and are optimized as such. The virtual directory remains in the crucial path of applications impacting performance by possibly performing vertical joins for every operation.

In another approach, applications may maintain their own repositories. Changes from one repository may be detected and propagated to another repository and vice versa by a meta-directory. Changes are detected in the meta-directory by using a LDAP change log. This is not a portable solution because change log format for every LDAP vendor may be different. Customers may not want to enable change log on their enterprise directory server because doing so affects performance. Also, the change log notification only happens after the fact.

LDAP supports change notification through asynchronous LDAP searches. The client is responsible for obtaining initial state of the object. This approach is not very versatile. The LDAP standard includes functionality for requesting pre-operation notifications; however, each vendor implements this functionality differently.

Therefore, it would be advantageous to provide an improved mechanism for rapid integration for directory based applications.

BRIEF SUMMARY OF THE INVENTION

The present invention recognizes the disadvantages of the prior art and provides a mechanism for rapid integration of directory based applications. A directory proxy lies between applications and the back end repositories. A filtering mechanism detects application specific operations using a set of rules. Notification of a detected operation is sent to interested application-specific synchronization elements. A notified synchronization element requests the parent application to perform a semantically equivalent operation.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
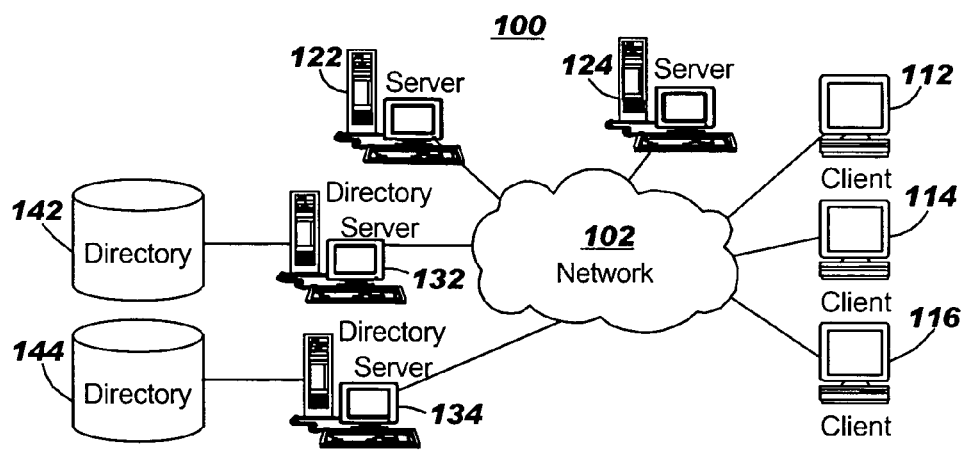
FIG. 1 depicts a pictorial representation of a network of data processing systems in which the present invention may be implemented.
Figure 2:
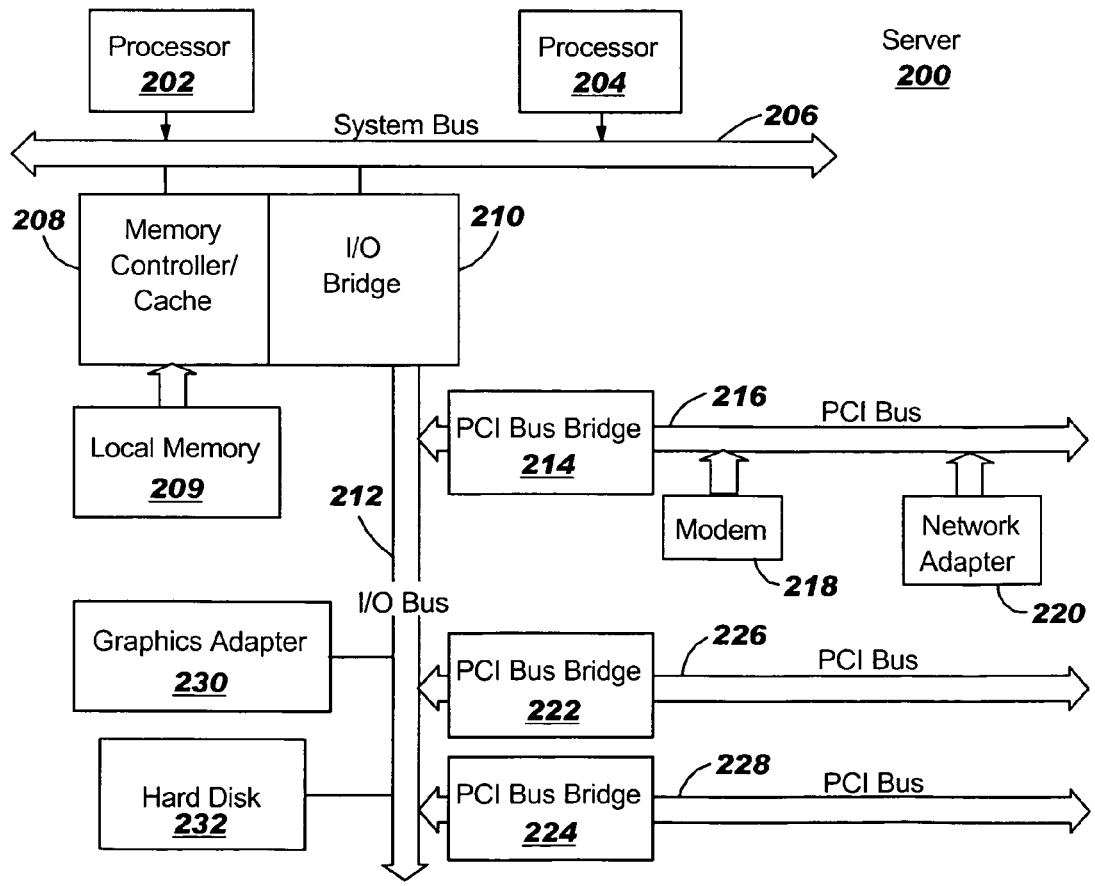
FIG. 2 is a block diagram of a data processing system that may be implemented as a server in accordance with an exemplary embodiment of the present invention.
Figure 3:
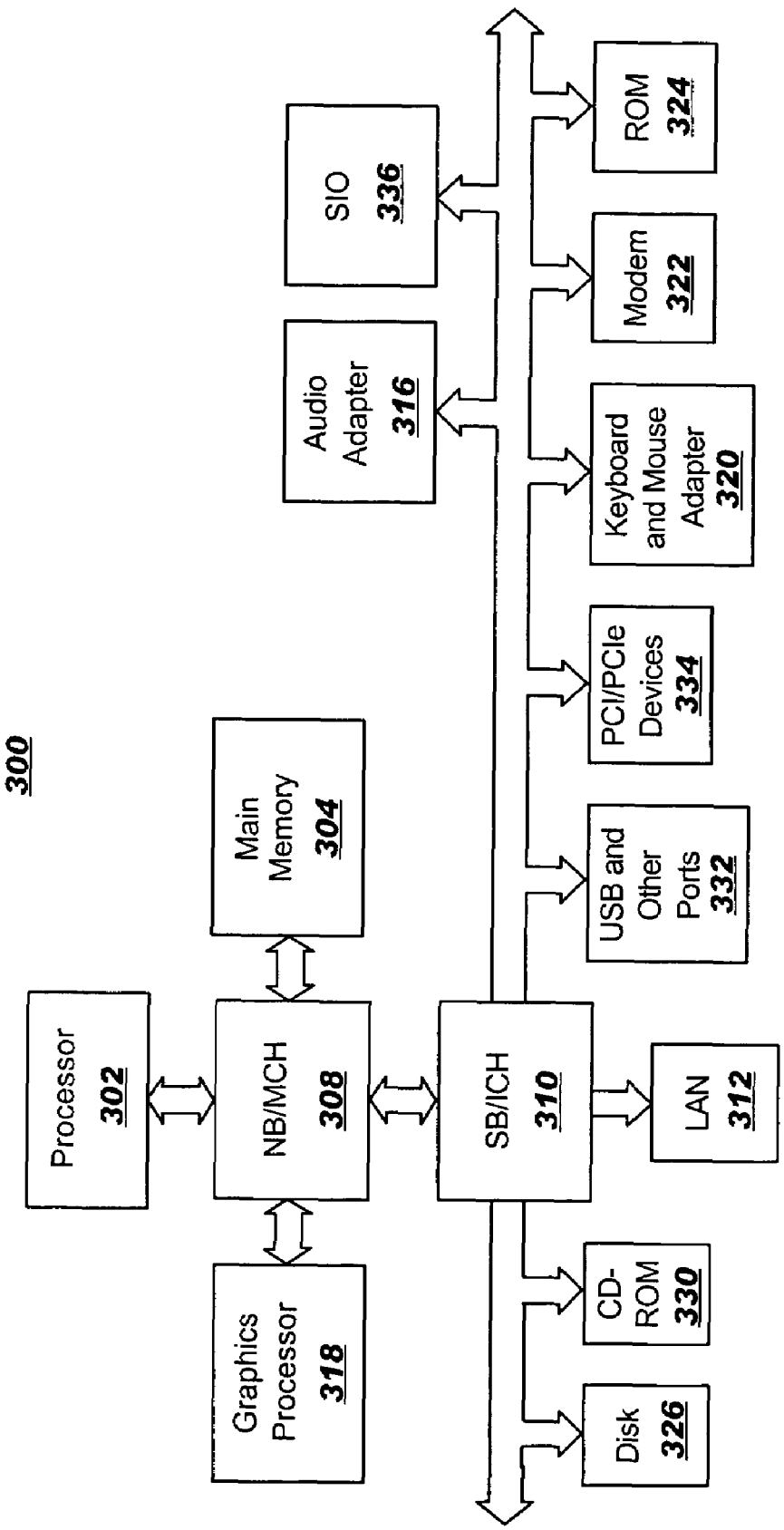
FIG. 3 is a block diagram of a data processing system in which the present invention may be implemented.

The present invention provides a method, apparatus, and computer program product, in a data processing device, for rapid integration for directory based applications. The data processing device may be a single-processor computing device, a multiprocessing data processing system, or a virtual processor environment in which multiple processors and multiple layers of software may be utilized to perform various aspects of the present invention. Therefore, the following FIGS. 1-3 are provided as representative diagrams of data processing environments in which the present invention may be implemented. It should be appreciated that FIGS. 1-3 are only exemplary and are not intended to assert or imply any limitation with regard to the environments in which the present invention may be implemented. Many modifications to the depicted environments may be made without departing from the spirit and scope of the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, servers 122, 124, 132, and 134 are connected to network 102. Servers 132, 134 are directory servers that provide access to directories 142, 144, respectively. In addition, clients 112, 114, and 116 are connected to network 102. These clients 112, 114, and 116 may be, for example, personal computers or network computers. In the depicted example, servers 122, 124 provide data, such as boot files, operating system images, and applications to clients 112-116. Clients 112, 114, and 116 are clients to servers 122, 124. Network data processing system 100 may include additional servers, clients, and other devices not shown.

Directory servers 132, 134 may be any type of directory servers that provide directory entries for applications. In one exemplary embodiment, directories 142, 144 are Lightweight Directory Access Protocol (LDAP) directories. However, other directories may also be used, such as the Microsoft™ Active Directory® service, for example. Generally speaking, a directory is a database of names, profile information, and machine addresses of users and resources on a network. A directory service is used to manage user accounts and network permissions. When sent a user name, directory server, such as directory server 132 or directory server 134, returns attributes of that individual that may include a telephone number, an e-mail address, or the like. Directory services may use highly specialized databases that are typically hierarchical in design and provide fast lookups.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Many applications on a network, such as network data processing system 100, may use directory services. Two or more applications may store semantically equivalent information in separate directories. Such applications may be good candidates for integration. However, integration of applications presents several problems.

In accordance with an exemplary embodiment of the present invention, a mechanism is provided for rapid integration of directory based applications. A directory proxy lies between applications and the back end repositories. A filtering mechanism detects application specific operations using a set of rules. Notification of a detected operation is sent to interested application-specific synchronization elements. A notified synchronization element requests the parent application to perform a semantically equivalent operation.

Referring to FIG. 2, a block diagram of a data processing system that may be implemented as a server, such as server 104 in FIG. 1, is depicted in accordance with an exemplary embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM eServer™ pSeries® system, a product of International Business Machines Corporation in Armonk, N.Y., running the Advanced Interactive Executive (AIX™) operating system or LINUX operating system.

With reference now to FIG. 3, a block diagram of a data processing system is shown in which the present invention may be implemented. Data processing system 300 is an example of a computer, such as client 108 in FIG. 1, in which code or instructions implementing the processes of the present invention may be located. In the depicted example, data processing system 300 employs a hub architecture including a north bridge and memory controller hub (MCH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. An object oriented programming system, such as the Java™ programming system, may run in conjunction with the operating system and provides calls to the operating system from Java programs or applications executing on data processing system 300. "JAVA" is a trademark of Sun Microsystems, Inc.

Instructions for the operating system, the object-oriented programming system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330.

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

For example, data processing system 300 may be a personal digital assistant (PDA), which is configured with flash memory to provide non-volatile memory for storing operating system files and/or user-generated data. The depicted example in FIG. 3 and above-described examples are not meant to imply architectural limitations. For example, data processing system 300 also may be a tablet computer, laptop computer, or telephone device in addition to taking the form of a PDA.

Figure 4:
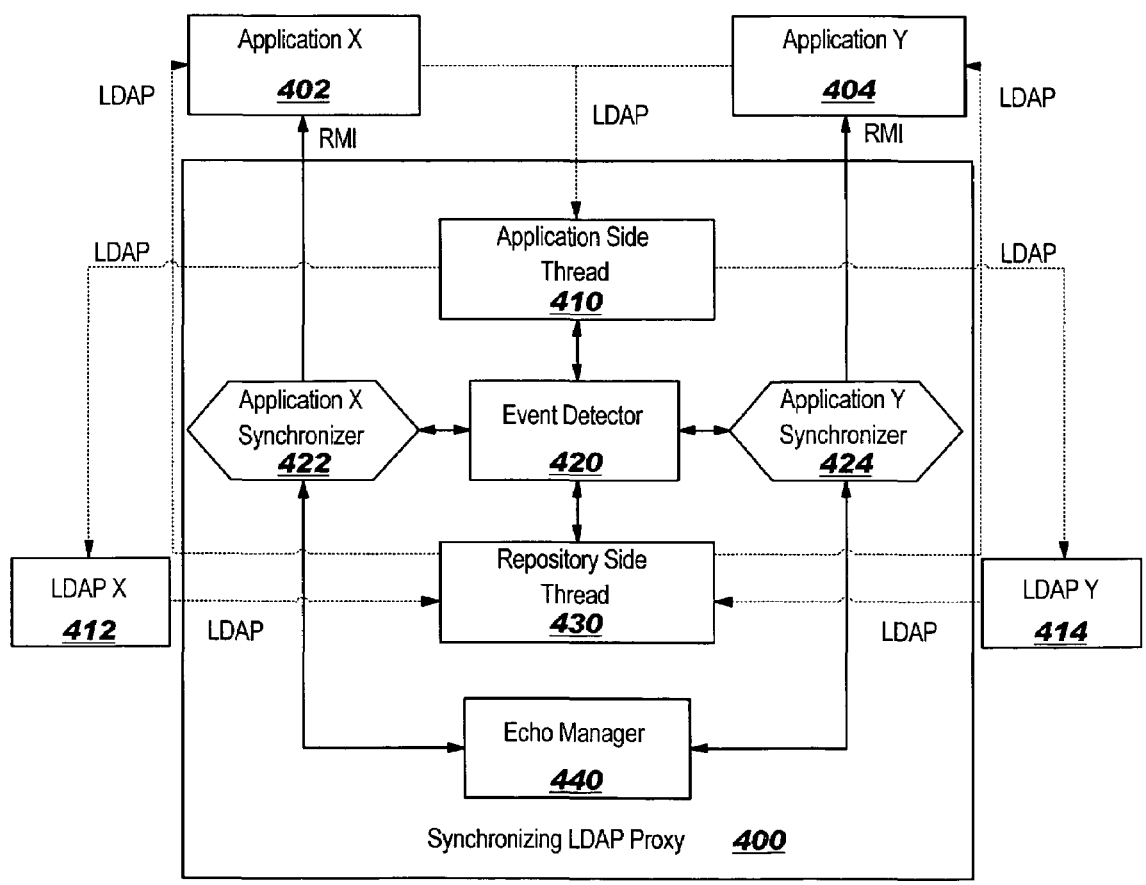
FIG. 4 is a block diagram of an LDAP proxy between applications and back-end LDAP repositories in accordance with an exemplary embodiment of the present invention.

With reference now to FIG. 4, a block diagram of an LDAP proxy between applications and back-end LDAP repositories is shown in accordance with an exemplary embodiment of the present invention. A filtering mechanism detects application-specific operations using a set of rules. Notification of a detected operation is sent to interested application-specific synchronization elements. A notified synchronization element requests the parent application to perform a semantically equivalent operation.

Application X 402 and application Y 404 are applications being integrated. Application X 402 uses LDAP directory X 412 and application Y 404 uses LDAP directory 414. Synchronizing LDAP proxy 400 includes two LDAP interfacing components: application side thread 410 and repository side thread 430. Application side thread (AST) 410 deals with the LDAP flow from applications to the repositories (directories 412, 414). The terms "directory" and "repository" are used interchangeably herein. Repository side thread (RST) 430 deals with flow from the repositories to the applications.

AST 410 decodes LDAP requests from applications and passes the request events to event detector 420. Decoded requests may be queued synchronously or asynchronously, as described in further detail below. In the depicted example, applications 402, 404 communicate with AST 410 using the LDAP protocol. AST 410 also passes requests to the target directory using the LDAP protocol. Similarly, RST 430 decodes responses from repositories and passes the responses to event detector 420. Directories 412, 414 communicate with RST 430 using the LDAP protocol. RST 430 also passes responses to the intended application using the LDAP protocol.

Application-specific synchronizers, such as application X synchronizer 422 and application Y synchronizer 424, use an application-provided application program interface (API) to perform operations that are semantically equivalent to certain detected operations. Each synchronizer 422, 424 registers with event detector 420 specifying the set of events, the event notification set, for which it should receive a notification. Information defining whether the notification should be synchronous or asynchronous may also be provided at registration time.

An event may be specified by its LDAP signature. An LDAP signature is defined by a sequence of LDAP operations that result when the high level event takes place. For example, creating a user (a high level event) may result in creating an inetOrgPerson object and then another LDAP entry to point to that person. Those two LDAP operations may constitute the signature of that event.

Event detector 420 detects events from a set that is the union of all event notification sets registered from synchronizers. When event detector 420 detects such an event, it notifies all interested synchronizers. If the notification is asynchronous, event detector 420 instructs the application side thread or repository side thread to forward the request or response to the repository or application immediately. If the notification is synchronous, event detector 420 waits for acknowledgement from the synchronizers before forwarding the request or response to the repository or application.

Event detector 420 may be used to discover LDAP signatures. Event detector 420 may record LDAP signatures of prevailing operations before synchronization starts. The developer may then use this as a starting point, greatly reducing development time.

Basic transaction support can be obtained from this mechanism. Consider an example where event detector 420 detects a user create request from application X 402. Application Y synchronizer 424 is interested in this event and gets notified synchronously. The user create request for application X 402 will not complete until application Y synchronizer 424 signals that a synchronization operation is completed. Thus, application Y synchronizer 424 creates an equivalent user in directory Y 414 in the disabled state and signals completion to event detector 420. Then, event detector 420 instructs application side thread 410 to forward the original request to directory X 412. The acknowledgement of this request from directory X 412 is detected as a completion event and event detector 420 notifies application Y synchronizer 424. Application Y synchronizer 424 then enables the created user in directory Y 414 and the transaction is complete.

Synchronizers may perform operations by making remote procedure calls (RPC) in applications using remote method invocation (RMI). Thus, in the above example, application Y synchronizer 424 creates a user in LDAP Y 414 by invoking one or more methods in application Y 404 to perform the operation. Application Y 404 would then send the appropriate LDAP request to application side thread 410.

When a synchronizer executes a synchronization operation, the operation itself may generate an event through event detector 420. Such events may be referred to as echo events. To distinguish between self-generated events and externally generated events, the synchronizer notifies echo manager 440 of expected events before issuing requests to perform synchronization operations. Any time a synchronizer is notified of an event, it may consult echo manager 440 to eliminate echoes.

The exemplary embodiment shown in FIG. 4 depicts LDAP directories. However, other types of directory services may also be used, such as the Microsoft™ Active Directory® service, for example. The communications protocol would change accordingly. Synchronizers may also communicate with applications to perform synchronization operations using protocols other than RMI. In addition, while two applications, two directories, and two synchronizers are shown, more applications and/or directories may be supported depending upon the implementation.

Figure 5:
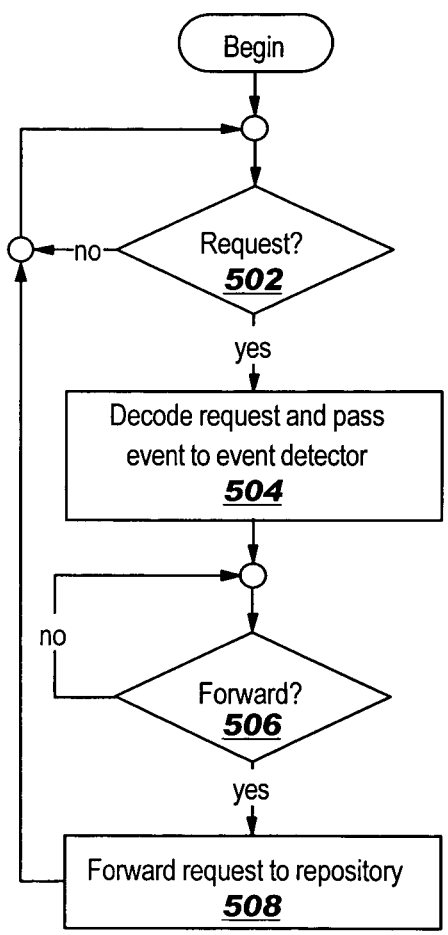
FIG. 5 is a flowchart illustrating operation of an application side thread in accordance with an exemplary embodiment of the present invention.

FIG. 5 is a flowchart illustrating operation of an application side thread in accordance with an exemplary embodiment of the present invention. Operation begins and the application side thread determines whether a request is received from an application (block 502). If a request is not received, operation returns to block 502 until a request is received. If the application side thread receives a request from an application in block 502, the application side thread decodes the request and passes the event to the event detector (block 504).

Then, the application side thread determines whether to forward the request to the repository (block 506). If notification for the event is asynchronous, then the event detector instructs the application side thread to forward the request to the repository immediately. However, if notification is asynchronous for the event, then the event detector waits until acknowledgement is received from the interested synchronizers signaling that synchronization operations are completed. Once all synchronization operations are completed, the event detector instructs the application side thread to forward the request to the repository.

If the application side thread is not instructed by the event detector to forward the request, operation returns to block 506 to determine whether to forward the request. If the application side thread receives instruction to forward the request in block 506, the application side thread forwards the request to the repository and operation returns to block 502 to determine whether a request is received from an application.

Figure 6:
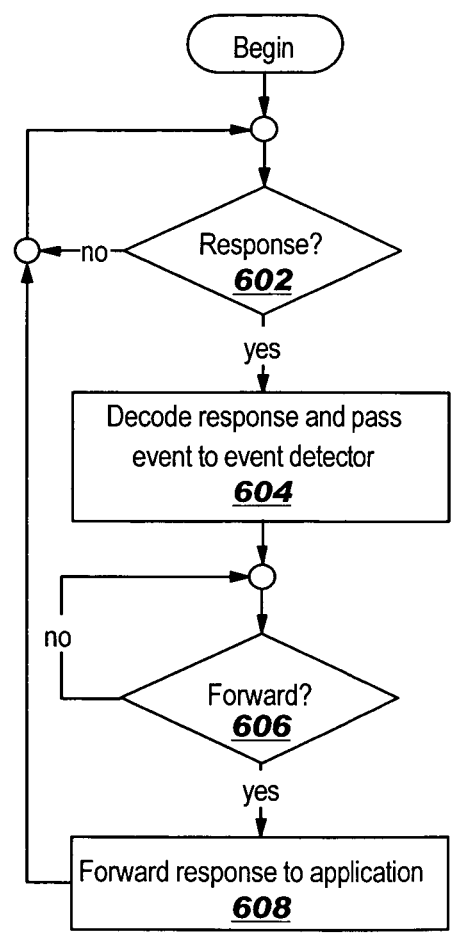
FIG. 6 is a flowchart illustrating operation of a repository side thread in accordance with an exemplary embodiment of the present invention.

FIG. 6 is a flowchart illustrating operation of a repository side thread in accordance with an exemplary embodiment of the present invention. Operation begins and the repository side thread determines whether a response is received from a repository (block 602). If a response is not received, operation returns to block 602 until a response is received. If the repository side thread receives a response from a repository in block 602, the repository side thread decodes the response and passes the event to the event detector (block 604).

Then, the repository side thread determines whether to forward the response to the application (block 606). If notification for the event is asynchronous, then the event detector instructs the repository side thread to forward the response to the application immediately. However, if notification is asynchronous for the event, then the event detector waits until acknowledgement is received from the interested synchronizers signaling that synchronization operations are completed. Once all synchronization operations are completed, the event detector instructs the repository side thread to forward the response to the application.

If the repository side thread is not instructed by the event detector to forward the response, operation returns to block 606 to determine whether to forward the response. If the repository side thread receives instruction to forward the response in block 606, the repository side thread forwards the response to the application and operation returns to block 602 to determine whether a response is received from a repository.

Figure 7:
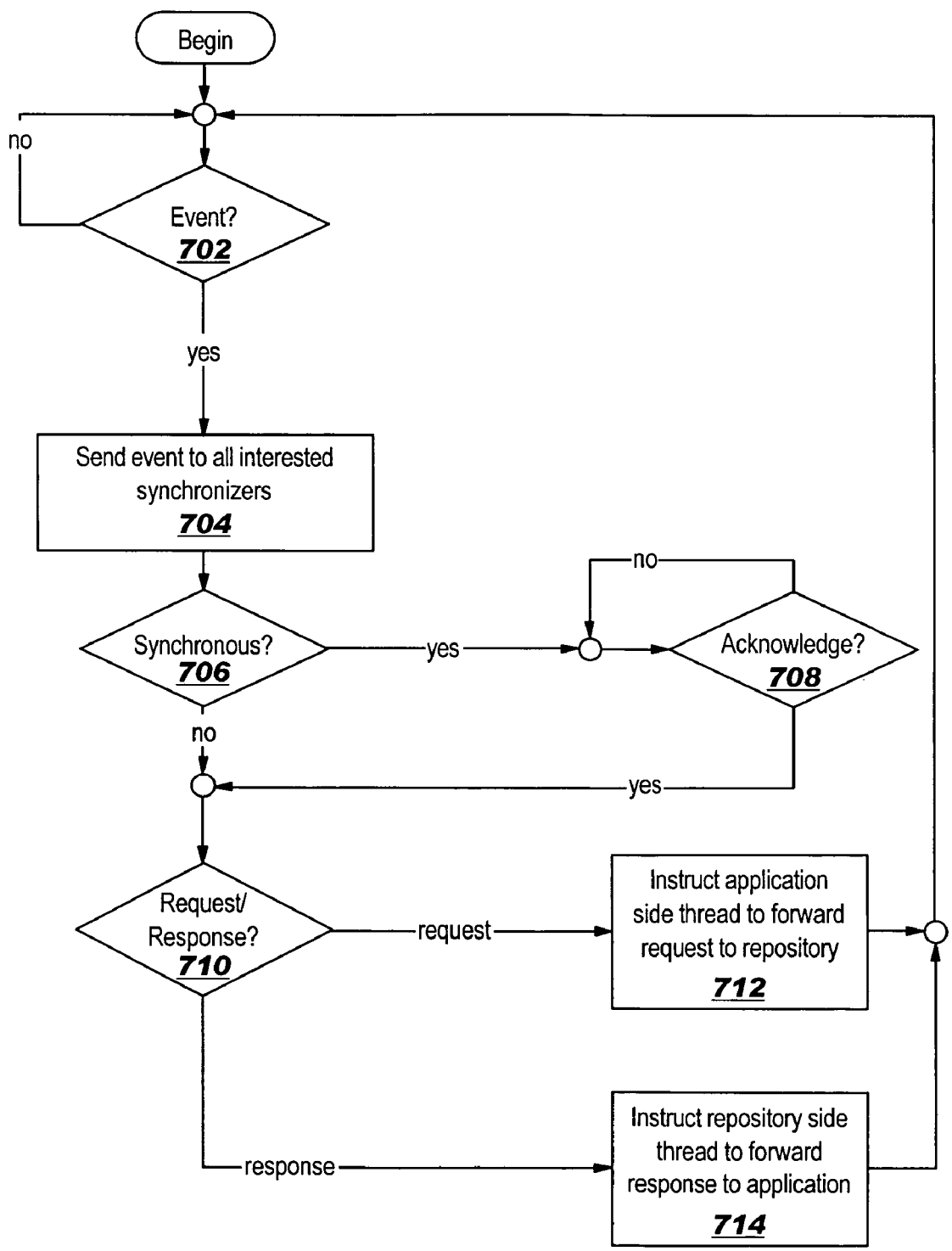
FIG. 7 is a flowchart illustrating operation of an event detector in accordance with an exemplary embodiment of the present invention.

FIG. 7 is a flowchart illustrating operation of an event detector in accordance with an exemplary embodiment of the present invention. Operation begins and the event detector determines whether an event is received from the application side thread or the repository side thread (block 702). If an event is not received, operation returns to block 702 until an event is received.

If an event is received in block 702, the event detector sends the event to all interested synchronizers (block 704). Next, the event detector determines whether the notification is synchronous for at least one interested synchronizer (block 706). If the notification is synchronous, the event detector determines whether acknowledgement indicating that a synchronization operation is completed is received from each synchronizer for which notification is synchronous (block 708). If acknowledgement is not received for all synchronizers, operation returns to block 708 until acknowledgement is received. If acknowledgement is received for all synchronizers for which notification is synchronous in block 708, operation proceeds to block 710. If notification is asynchronous for all interested synchronizers in block 706, operation proceeds directly to block 710.

In block 710, the event detector determines whether the event is a request or a response. If the event is a request, the event detector instructs the application side thread to forward the request to the repository (block 712). Thereafter, operation returns to block 702 to determine whether an event is received. If the event is a response from a repository in block 710, the event detector instructs the repository side thread to forward the response to the application (block 714). Thereafter, operation returns to block 702 to determine whether an event is received.

Figure 8:
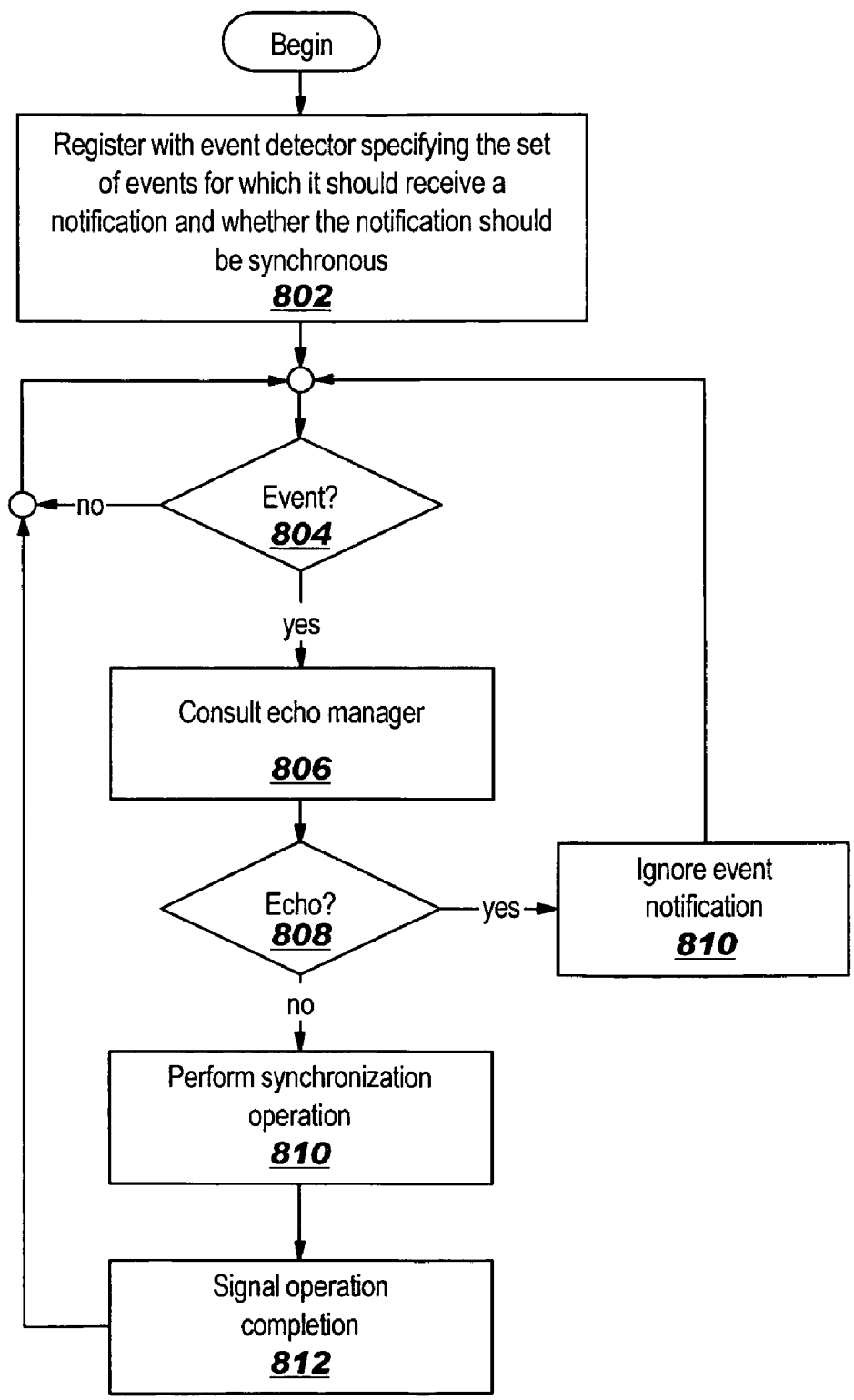
FIG. 8 is a flowchart illustrating operation of a synchronizer in accordance with an exemplary embodiment of the present invention.

FIG. 8 is a flowchart illustrating operation of a synchronizer in accordance with an exemplary embodiment of the present invention. Operation begins and the synchronizer registers with the event detector, specifying the set of events for which it should receive a notification and whether the notification should be synchronous (block 802). Then, the synchronizer determines whether an event notification is received from the event detector (block 804). If an event notification is not received, operation returns to block 804 until an event notification is received.

If an event notification is received in block 804, the synchronizer consults the echo manager (block 806) and determines whether the notification is an echo event (block 808). If the notification is for an echo event, the synchronizer ignores the event notification (block 810) and operation returns to block 804 to determine whether an event notification is received.

If the notification is not an echo event in block 808, the synchronizer performs a synchronization operation (block 810) and signals completion of the synchronization operation (block 812). Thereafter, operation returns to block 804 to determine whether an event notification is received.

Thus, the present invention provides a mechanism for synchronizing directory update operations of several applications so that the operations of one application trigger operations of one or several other applications. The proxy of present invention differs from a virtual directory in that the proxy is not used to transform the appearance of the back end. The proxy of the present invention is present only to catch changes as they occur. Furthermore, the mechanism of the present invention differs from a meta-directory in that synchronization is actually performed by the applications, the directories are not directly updated, and the mechanism of the present invention does not depend on a notification function built into the repository.

It is important to note that while the present invention has been described in the context of a fully functioning data processing system, those of ordinary skill in the art will appreciate that the processes of the present invention are capable of being distributed in the form of a computer readable medium of instructions and a variety of forms. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method, in a synchronizing proxy, for synchronizing directory based applications, the method comprising:
    operating an application-side thread to pass a flow of first events from one or more of a plurality of applications to one or more of a plurality of repositories, wherein each of said applications uniquely corresponds to a different one of said repositories, and each of said applications directs first events only to its corresponding repository;
    operating a repository-side thread to pass a flow of second events from one or more of said repositories to one or more of said applications, wherein each of said repositories directs second events only to its corresponding application;
    operating each of a plurality of synchronizers to register information with a single event detector that is common to all of said plurality of synchronizers, wherein each of said synchronizers is associated with a different one of said applications and its uniquely corresponding repository, and the registered information specifies certain of said first and second events for which at least one synchronizer should receive a notification;
    passing each of said first events to the common event detector from said application-side thread, and passing each of said second events to the common event detector from said repository-side thread;
    operating the event detector to detect first events passed from the application-side thread and second events passed from the repository-side thread, and to selectively send notification of respective detected first and second events to respective synchronizers;
    further operating the event detector to determine whether the event notification sent for a particular detected event should be a synchronous notification or an asynchronous notification; and
    responsive to determining that the notification for said particular detected event should be synchronous, providing a selected delay before forwarding said particular event to any of said repositories or applications.

2. The method of claim 1, further comprising:
    decoding a request from a first application for an operation on a first repository to form said particular event;
    responsive to said particular event, sending a particular synchronous event notification to at least a first interested synchronizer;
    responsive to the particular synchronous notification, causing, by the first interested synchronizer, a second application to perform a synchronization operation on a second repository; and
    responsive to completion of the synchronization operation, ending said delay and forwarding said particular event to the first repository.

3. The method of claim 1, further comprising:
    responsive to sending a synchronous notification for said particular detected event to a particular synchronizer, operating said particular synchronizer to perform a specified synchronization operation; and
    following completion of said specified synchronization operation, ending said delay and forwarding said particular event to one of said repositories or applications, selectively.

4. The method of claim 3, wherein each of the repositories is a Lightweight Directory Access Protocol directory, the method further comprising:
    responsive to determining that the notification for said particular detected event should be asynchronous, immediately forwarding said particular event to one of said repositories or applications, selectively.

5. The method of claim 2, wherein the synchronization operation generates a completion event, the method further comprising:
    forwarding the decoded request, comprising said particular event, to the first repository responsive to the completion event.

6. The method of claim 5, wherein each of said first events is limited to a request from an application, and each of said second events is limited to a response from a repository.

7. The method of claim 5, the method further comprising:
    receiving, by a first interested synchronizer, a completion event notification;
    consulting, by the first interested synchronizer, an echo manager to determine whether the completion event notification was generated by the first interested synchronizer; and
    ignoring, by the first interested synchronizer, the completion event notification if the completion event notification was generated by the first interested synchronizer.

8. The method of claim 1 further comprising:
    decoding a response from a first repository to a first application to form said particular event; and
    responsive to said particular event, sending a particular event notification to at least one synchronizer.

9. The method of claim 8, wherein the particular event notification is synchronous.

10. An apparatus, in a synchronizing proxy, for synchronizing directory based applications, the apparatus comprising:
    a selected number of processing devices;
    a selected number of memory devices;
    an application-side thread operable to pass a flow of first events from one or more of a plurality of applications contained in one or more of said processor devices to one or more of a plurality of repositories contained in one or more of said memory devices, wherein each of said applications uniquely corresponds to a different one of said repositories, and each of said applications directs first events only to its corresponding repository;
    a single event detector contained in one of said processing devices;
    a repository-side thread operable to pass a flow of second events from one or more of said repositories to one or more of said applications, wherein each of said repositories directs second events only to its corresponding application;
    a plurality of synchronizers, each contained in one of said processor devices, wherein each synchronizer is operable to register information with the event detector specifying certain of said first and second events for which at least one synchronizer should receive a notification, and wherein the single event detector is common to all of said plurality of synchronizers, and each of said synchronizers is associated with a different one of said applications and its uniquely corresponding repository;

means for passing each of said first events to the common event detector from said application-side thread, and for passing each of said second events to the common event detector from said repository-side thread;

wherein the event detector is operable to detect first events passed from the application-side thread and second events passed from the repository-side thread, and to selectively send notification of respective detected first and second events to respective synchronizers; and the event detector is further operable to determine whether the event notification sent for a particular detected event should be a synchronous or an asynchronous notification, and responsive to determining that the notification for said particular detected event should be synchronous, the event detector provides a selected delay in forwarding said particular event to any of said repositories or applications.

11. The apparatus of claim 10, wherein the information defines whether notification should be synchronous or asynchronous.

12. The apparatus of claim 11, wherein the event detector detects events from a set that is a union of all events registered from at least one synchronizer.

13. The apparatus of claim 10, wherein the application-side thread decodes a request from a first application for an operation on a first repository to form said particular event;

wherein the event detector sends a particular synchronous event notification to a given interested synchronizer responsive to the event being in the set of registered events; and wherein the given interested synchronizer, responsive to the event notification, causes a second application to perform a synchronization operation on a second repository; and wherein responsive to completion of the synchronization operation, ending said delay and forwarding said particular event to the first repository.

14. The apparatus of claim 13, wherein the first repository or the second repository is a Lightweight Directory Access Protocol directory.

15. The apparatus of claim 13, wherein the synchronization operation comprises a semantically equivalent operation to the request.

16. The apparatus of claim 10, wherein responsive to determining that the notification for said particular detected event should be asynchronous, said particular event is immediately forwarded to one of said repositories or applications, selectively.

17. The apparatus of claim 13, wherein the synchronization operation generates a completion event, and wherein the application-side thread forwards the request to the first repository responsive to the completion event.

18. The apparatus of claim 10, further comprising:

an echo manager, wherein upon receiving a given event notification, a given synchronizer consults the echo manager to determine whether the given event notification was generated by the given synchronizer, wherein the given synchronizer ignores the given event notification if the given event notification was generated by the given synchronizer.

19. The apparatus of claim 10, wherein the repository-side thread decodes a response from a first repository to a first application to form said particular event;

wherein the event detector sends a particular event notification to at least one synchronizer responsive to said particular event.

20. A computer program product, in a computer readable medium that is recordable and is in a synchronizing proxy, for synchronizing directory based applications, the computer program product comprising:

instructions for operating an application-side thread to pass a flow of first events from one or more of a plurality of applications to one or more of a plurality of repositories, wherein each of said applications uniquely corresponds to a different one of said repositories, and each of said applications directs first events only to its corresponding repository;

instructions for operating a repository-side thread to pass a flow of second events from one or more of said repositories to one or more of said applications, wherein each of said repositories directs second events only to its corresponding application;

instructions for operating each of a plurality of synchronizers to register information with a single specified event detector that is common to all of said plurality of synchronizers, wherein each of said synchronizers is associated with a different one of said applications and its uniquely corresponding repository, and the information registered for a given synchronizer specifies certain of said first and second events for which at least one synchronizer should receive a notification;

instructions for passing each of said first events to the common event detector from said application-side thread, and passing each of said second events to the common event detector from said repository-side thread;

instructions for operating the event detector to detect first events passed from the application-side thread and second events passed from the repository-side thread, and to selectively send notification of respective detected first and second events to respective synchronizers;

instructions for further operating the event detector to determine whether the event notification sent for a particular detected event should be a synchronous notification or an asynchronous notification; and instructions responsive to determining that the notification for said particular detected event should be synchronous, for providing a selected delay before forwarding said particular event to any of said repositories or applications.

* * * * *